United States Patent [19]

Siegel

[11] Patent Number: 5,098,171

[45] Date of Patent: * Mar. 24, 1992

[54] BRAKE SYSTEM WITH STROKE SENSORS AND HYDRAULIC BOOSTING

[75] Inventor: Heinz Siegel, Stuttgart, Fed. Rep. of Germany

[73] Assignee: Robert Bosch GmbH, Stuttgart, Fed. Rep. of Germany

[*] Notice: The portion of the term of this patent subsequent to Jun. 11, 2008 has been disclaimed.

[21] Appl. No.: 424,648

[22] Filed: Oct. 20, 1989

[30] Foreign Application Priority Data

Dec. 15, 1988 [DE] Fed. Rep. of Germany ....... 3842225

[51] Int. Cl.$^5$ .................................................. B60T 08/40
[52] U.S. Cl. .............................. 303/113 SS; 303/114 R
[58] Field of Search .................. 303/54, 100, 113, 114, 303/113 SS, 114 R

[56] References Cited

U.S. PATENT DOCUMENTS

| | | | |
|---|---|---|---|
| 4,557,528 | 12/1985 | Leiber | 303/100 X |
| 4,580,847 | 4/1986 | Burgdorf | 303/100 |
| 4,658,939 | 4/1987 | Kircher et al. | 303/003 X |
| 4,678,243 | 7/1987 | Leiber | 303/114 X |
| 4,776,646 | 10/1988 | Siegel | 303/114 |
| 4,778,224 | 10/1988 | Leiber | 303/114 |
| 4,824,186 | 4/1989 | Leiber et al. | 303/100 X |

FOREIGN PATENT DOCUMENTS

3241662 5/1984 Fed. Rep. of Germany.

Primary Examiner—Robert J. Oberleitner
Assistant Examiner—Alfred Muratori
Attorney, Agent, or Firm—Edwin E. Greigg; Ronald E. Greigg

[57] ABSTRACT

A brake system having a master brake cylinder embodied as an electrohydraulic followup booster, this cylinder communicates with a brake pedal via a piston rod. The piston rod acts upon a master cylinder piston, which in turn puts a brake chamber under brake pressure. As a result, brake fluid flows via brake lines to various wheel brake cylinders. The master cylinder piston is also assigned a servo piston chamber, which communicates via a control element with a device for supplying servo brake fluid. This control element is controlled via a travel transducer that detects the motion of the piston rod. Additionally, however, the master cylinder piston is assigned a travel transducer which independently of the motion of the piston rod detects the actual motion of the master cylinder piston, and by way of which the control element is likewise triggered for the servo brake fluid, via an electronic unit.

22 Claims, 7 Drawing Sheets

BRAKE SYSTEM WITH STROKE SENSORS AND HYDRAULIC BOOSTING

BACKGROUND OF THE INVENTION

The invention relates to a brake system having a master brake cylinder embodied as a hydraulic booster, as defined herein.

As a rule, such brake systems have two brake circuits, which preferably include suitable control elements for anti-skid control. Preferably, traction control is provided as well. In such a brake system, it is essential first that the supply of control fluid be purposefully controlled, and second that if applicable it be adapted to the control elements of the anti-skid and traction control means.

For example, German Patent 32 41 662 discloses a hydraulic brake system actuatable with braking force, in which the actuation of the device for supplying control fluid is controlled via a travel transducer disposed between the piston rod and the servo piston. Yet only a short stroke is possible between the piston rod and the servo piston. Moreover, control of the admission of control fluid is done as a function of the pedal travel, yet the travel itself (that is, the travel of the rod, servo piston and master cylinder piston) is not sensed.

OBJECT AND SUMMARY OF THE INVENTION

With a brake system defined by the body of the master brake cylinder, contrarily, it is precisely this travel of the master cylinder piston and piston rod itself that is observed and processed into control signals, via a suitable electronic unit. The pedal travel generated by the driver is decoupled from the servo piston travel or master cylinder piston travel. This decoupling of the piston rod and servo piston has considerable advantages for traction control, because the servo piston can be operated while the piston rod is at a standstill, as explained hereinafter. The driver's wishes, expressed in the braking pressure exerted on the brake pedal, are ascertained by a travel transducer as before, but the actual travel of the master cylinder piston is now ascertained independently, by the second travel transducer.

Both input signals of the travel transducers are picked up and received by a suitable electronic unit. From this unit, the corresponding output signals then reach control elements for the delivery of control fluid. If the master cylinder piston travel matches the prescribed travel of the piston rod, for example, then the control element is moved to its holding position, so that no further buildup of a servo pressure takes place.

Additionally, the control element may comprise a 3/3-way magnetic valve, via which the applicable control piston chamber is either blocked, or made to communicate with either the control fluid supply tank or a pressure reservoir or a suitable feed pump. Preferably, however, two 2/2-way magnet valves are used, one in the line to the supply tank and the other in the line to the pressure reservoir or feed pump. Because these magnetic valves are electrically triggered, there is little friction between the piston rod and the master cylinder piston, as is otherwise the case in known servo brake boosters. The initial force to be exerted on the brake pedal can be kept low, which conforms with automobile manufacturer's wishes.

Suitable potentiometers can for example be used as the travel transducers. Inductive transducers are preferred, however; they are in turn integrated into the follower booster. It is particularly preferable for the travel transducers to be guided axially parallel to the master cylinder piston. This keeps the structural length of the follower booster minimal. For instance, it may be provided that the travel transducers are guided in suitable blind bores, axially parallel to the stepped bore in which the master cylinder piston slides as well. In that case, the various coil laminations, which are penetrated by the transducers and generate the appropriate electrical signals for the electronics, are disposed in these blind bores as well.

Both transducers are preferably braced against compression springs in these blind bores, pass through the coil laminations, and then on the other end meet corresponding radial extensions or stops or the like on the piston rod or master cylinder piston.

If the brake system is provided with an ABS control system having at least one open control circuit, then during ABS control, for safety reasons, the master cylinder piston must be restored counter to the servo and pedal force. In the present invention, suitable restoring devices are accordingly associated with the master cylinder piston. This restoring device comprises at least one restoring piston, but to avoid tilting forces, two symmetrically disposed restoring pistons are preferred. Each restoring piston is subject to the pressure of a pressure fluid and acts upon a radial stop or the like on the master cylinder piston. This radial stop may for instance be disposed in a position rotated by 90° compared with the radial stop that is engaged by the travel transducer. The opportunity then presents itself of guiding the restoring pistons in the booster in blind bores that are likewise axially parallel to the master cylinder bore, with the corresponding restoring chamber located there as well to receive the pressure fluid.

In the brake system, the restoring chamber communicates via an outlet valve with the supply tank and via a feed valve with the line to the control piston chamber. In ABS operation, this feed valve switches to allow control fluid to flow through it, while the outlet valve and the wheel valves are blocked. The restoration of the master cylinder piston is then effected in this way.

While in the last exemplary embodiment above, the traction control, controlled by the electronic unit, is effected directly from the pressure reservoir or feed pump, a further exemplary embodiment of the invention has a further valve in the supply line to the control piston chamber. If one of the wheel sensors indicates slippage at a wheel, then this valve blocks the fluid flow to the control piston chamber, and further valves close the brake lines toward the applicable brake chamber in the master cylinder. In contrast, the aforementioned feed valve is opened, and by way of it, control fluid can then flow via appropriate check valves into the brake lines. The restoring pistons are at that time in their terminal position.

In a particularly preferred embodiment of the invention, the restoring device is associated with the traction control. To this end, the aforementioned restoring pistons are firmly connected to the radial stops on the master cylinder piston. However, the connection should be made in such a way that a certain idle stroke is still allowed. According to the invention, the restoring piston in this exemplary embodiment comprises an actual piston part per se and a tappet rod, with which it is affixed to the master cylinder piston. The piston part divides the aforementioned axially parallel blind bore into a restoring chamber and a work chamber for the traction control. The tappet rod reaches through a lip seal and a closure bushing in the blind bore.

In the event of a traction control situation, it suffices in this exemplary embodiment to put the work chambers under pressure, so that longitudinal guidance of the master cylinder piston, and hence a buildup of brake pressure, are effected via the restoring pistons. The advantage of this exemplary embodiment is above all that the servo brake boosting is separate from the traction control.

The delivery of pressure fluid to the work chamber for traction control can be made from a separate circuit. However, the connection of the work chamber with the existing pressure reservoir and the control elements for supplying control fluid is preferred. In that case, it suffices for the supply line for control fluid to the control piston chamber to include a corresponding valve, which blocks the supply line at the instant when traction control is to take place.

Since in the present case the servo piston motion is decoupled from the piston rod motion by the two travel transducers, additional data can also be processed or ascertained. This applies for example to the load state, brake wear, brake circuit failure, and tire grip on the road surface.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
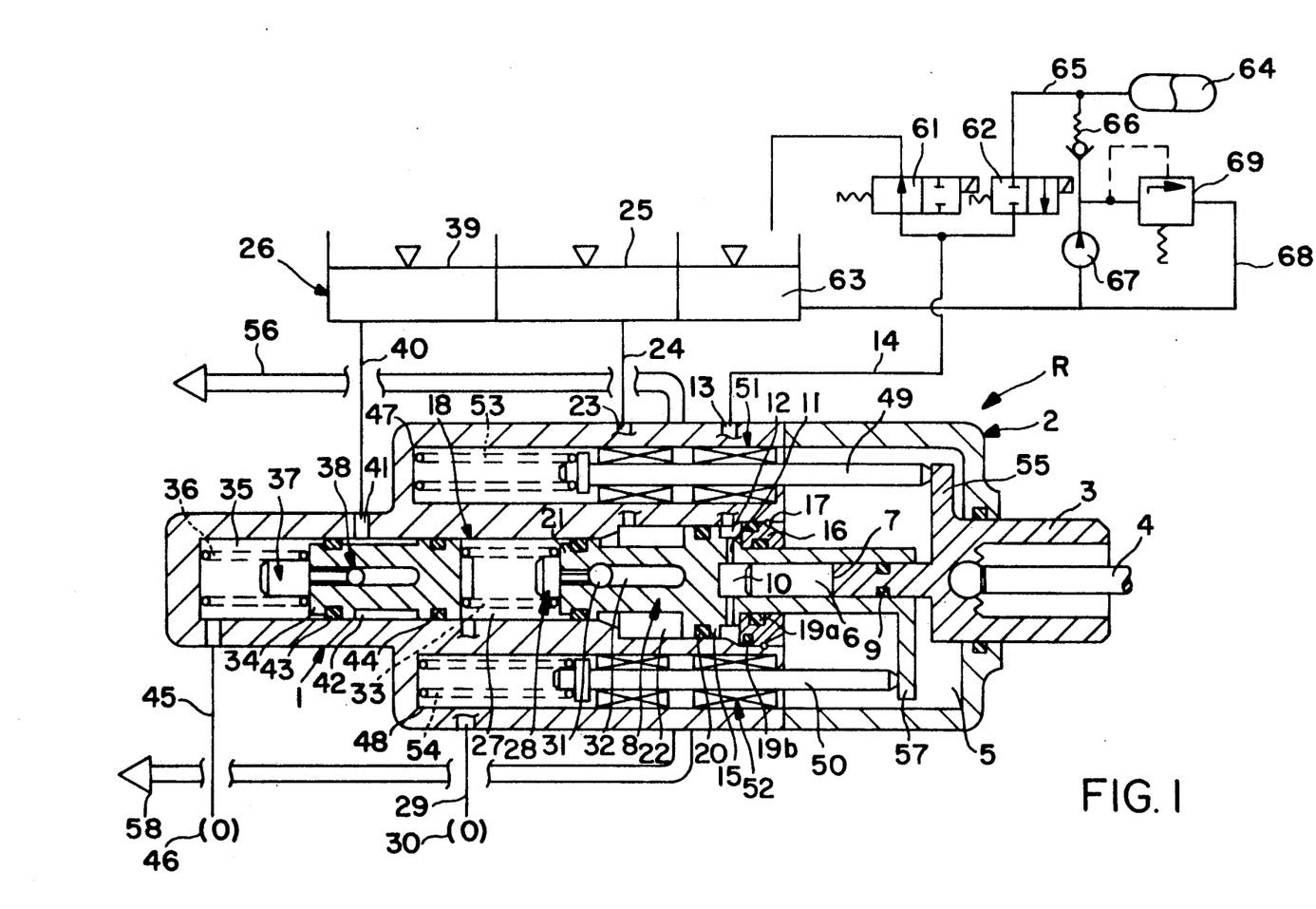
FIG. 1 is a longitudinal section through a hydraulic booster according to the invention, with part of a brake system shown as a block circuit diagram.

An electrohydraulic booster R as shown in FIG. 1 has a master cylinder housing 1 and a cap-type housing closure 2. A piston rod 3 passes into the cap housing 2 and is operatively connected with a brake pedal, not shown in further detail in FIG. 1, via a flanged-in pivot rod 4. Via this pivot rod 4, the pedal motion is transmitted to the piston rod 3.

Inside the cap housing 2, in an interior 5 defined by the cap housing 2, the piston rod 3 with a tappet 6 engages an axial bore 7 of a master cylinder piston 8 and slides in this axial bore 7, which is sealed off from the interior 5 by a sealing ring 9.

By means of the tappet 6, a volumetrically variable chamber 10 is formed in the axial bore 7, communicating via radial bores 11 in the master cylinder piston 8 with a control piston chamber 12. Via a suitable radial bore 13 in the master cylinder housing 1, this control piston chamber 12 can be acted upon with brake fluid through a supply line 14.

The control piston chamber 12 is also defined between an annular large diameter portion 15 of the master cylinder piston 8 and a guide bushing 16, and the guide bushing 16 is retained in a stepped bore 18 of the master cylinder housing 1. Both the annular piston portion 15 and the guide bushing 16 have suitable sealing rings 19, 19a and 20 sealing them from the stepped bore 18.

An annular chamber 22 is defined between the annular piston portion 15 and the actual brake piston portion 21 of the master cylinder piston 8 and communicates via a corresponding bore 23 and a line 24 with a chamber 25 of a supply tank 26 for brake fluid. Via this bore 23 brake fluid is carried out of the supply tank 26 into a first brake chamber 27 via a central valve 28 in the master cylinder piston. When pressure is exerted on the master cylinder piston 8, the central valve 28 closes, so that the brake fluid present in the first brake chamber 27 can flow via a brake line 29 to reach the various wheel brake cylinders 30, shown schematically in the drawing. When the brake pressure lets up, the central valve 28 is kept open in a known manner by means of a pin 31, so that the brake fluid, which may be under pressure, can flow via the bore 23 and a corresponding slit 32, in which the pin 31 slides as well, and via the central valve 28 to reach the first brake chamber 27.

The master cylinder piston 8 is supported toward its face end, via a restoring spring 33 in the first brake chamber 27, against a further master cylinder piston 34, which is likewise slidably supported in the stepped bore 18. With the master cylinder housing 1, this master cylinder piston 34 defines a second brake chamber 35, and a restoring spring 36 is likewise provided in this second brake chamber 35. This master cylinder piston 34 likewise has a central valve 37, which is embodied similarly to the central valve 28. In the outset position of the piston 34, this central valve 37 is likewise kept open in a known manner by a pin 38.

Via this central valve 37, the second brake chamber 35 can be supplied with brake fluid from a further chamber 39 of the supply tank 26; to this end, a corresponding line 40 and a bore 41 leading to an annular chamber 42 are provided, located between two annular piston portions of the master cylinder piston 34. These annular piston portions are braced against the stepped bore 18 via corresponding sealing rings 43 and 44.

The second brake chamber 35 also communicates with wheel brake cylinders 46, via a corresponding brake line 45.

Further blind bores 47 and 48 are provided, axially parallel to the stepped bore, and sliding in each is an inductive transducer 49 and 50, respectively. Respective coil laminations 51 and 52 surround each inductive transducer 49 and 50, and each transducer 49 and 50 is likewise braced via a corresponding compression spring 53 and 54, respectively.

The inductive transducer 49 meets a radial extension 55 of the piston rod 3 and thus picks up the motion of the piston rod. By means of the extension, an output signal is generated and fed to an electronic unit, to be described hereinafter, via an electrical line 56.

The other inductive transducer 50, contrarily, meets a radial stop 57 of the master cylinder piston 8 inside the interior 5. Via this stop, an output signal is again generated and fed via an electrical line 58 to the aforementioned electronic unit.

The electronic unit 60, shown in FIG. 7 and described in detail below, controls two magnetic valves 61 and 62; the magnetic valve 61 is capable of connecting the supply line 14 with a further chamber 63 of the supply tank 26 for control fluid, while the magnetic valve 62 establishes a connection with a pressure reservoir 64 for control fluid. Via a one-way check valve 66, a feed pump 67 is also included in the connecting line 65 between the pressure reservoir 64 and the magnetic valve 62; by means of the feed pump, control fluid can be fed from the chamber 63 to the pressure reservoir 64, or directly to the supply line 14. For safety's sake a bypass 68 with a pressure limiting valve 69 feeds fluid back to the feed pump 67.

The mode of operation of the booster R according to the invention is as follows:

If a braking motion is initiated, the piston rod moves to the left under the pressure of the pivot rod 4 and displaces the inductive transducer 49 counter to the pressure of the compression spring 53. As a result, an output signal is transmitted over the electrical line 56 to the electronic unit 60, which in turn sends a signal that closes the magnetic valve 61 and opens the magnetic valve 62. This causes control fluid, which is under pressure, to flow out of the pressure reservoir 64 into the supply line 14, through the radial bore 13, and into the control piston chamber 12. As a result, the master cylinder piston 8, functioning as a servo piston, is displaced leftward.

With the motion of the master cylinder piston 8, however, the second inductive transducer 50 shifts as well, and in turn, via its electrical line 58, represents the position of the master cylinder piston 8, acting as servo piston, to the electronic unit. If the master cylinder piston travel matches the prescribed travel of the piston rod (pedal travel), then both magnetic valves 61 and 62 are moved into the holding position, that is, the closing position.

On an ensuing decrease in the brake pressure, the magnetic valve 61 is opened via the electronic unit 60, while the magnetic valve 62 remains in the closing position. Control fluid can now flow out of the control piston chamber 12 back via the supply line 14 into the chamber 63 of the supply tank 26. As a result, the master cylinder piston 8 can be restored to its original position.

As described above, the control piston chamber 12 communicates via radial bores 11 with a chamber 10, the volume of which is variable by the tappet 6. Pressure building up in the control piston chamber 12 therefore has a direct effect on this tappet, or piston rod, as well, thus producing pedal feedback.

Naturally, the inductive transducers 49 and 50 are merely examples; instead of these two transducers 49 and 50, two potentiometers could be used, for instance.

An embodiment with only one inductive transducer would also be conceivable, but the kinematics are simplified if two inductive transducers are used. The coil laminations 51 and 52 can then be stationary and need not reciprocate.

For safety reasons, in brake systems with an anti-skid control system and at least one open control circuit, the servo or master cylinder piston in ABS control must be restored counter to the servo and pedal forces. As a rule, this is done by a central restoring piston, but that would increase the structural length of the overall booster.

Figure 2:
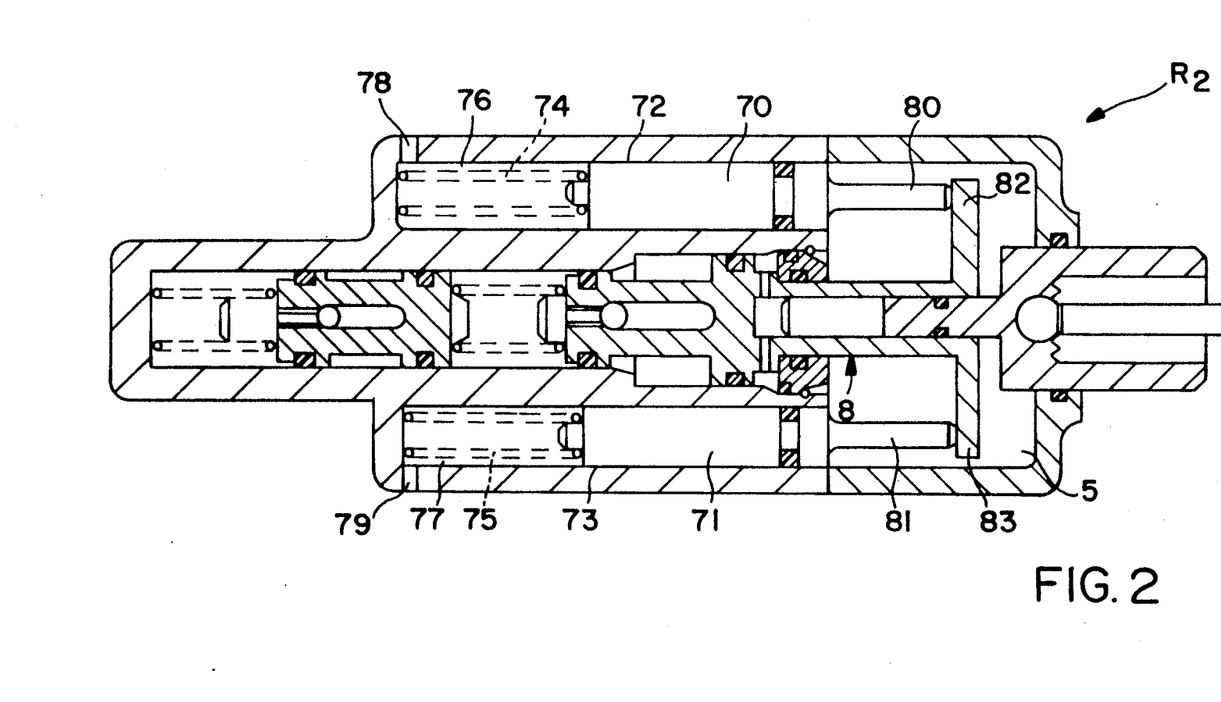
FIG. 2 is a longitudinal section through the booster of FIG. 1, in a different plane.

According to the invention, in the present exemplary embodiment R2 shown in FIG. 2, two parallel restoring pistons 70 and 71 are provided, sliding in further axially parallel blind bores 72 and 73. On one end these restoring pistons 70 and 71 are braced counter to restoring springs 74 and 75, which are located in restoring chambers 76 and 77. Via suitable connection bores 78 and 79, the restoring chambers 76 and 77 are supplied with a restoring fluid, so that in ABS control the restoring pistons 70 and 71 are guided toward the right. With corresponding pins 80 and 81, they then meet further radial stops 82 and 83 formed on the master cylinder piston 8 in the interior 5.

Figure 3:
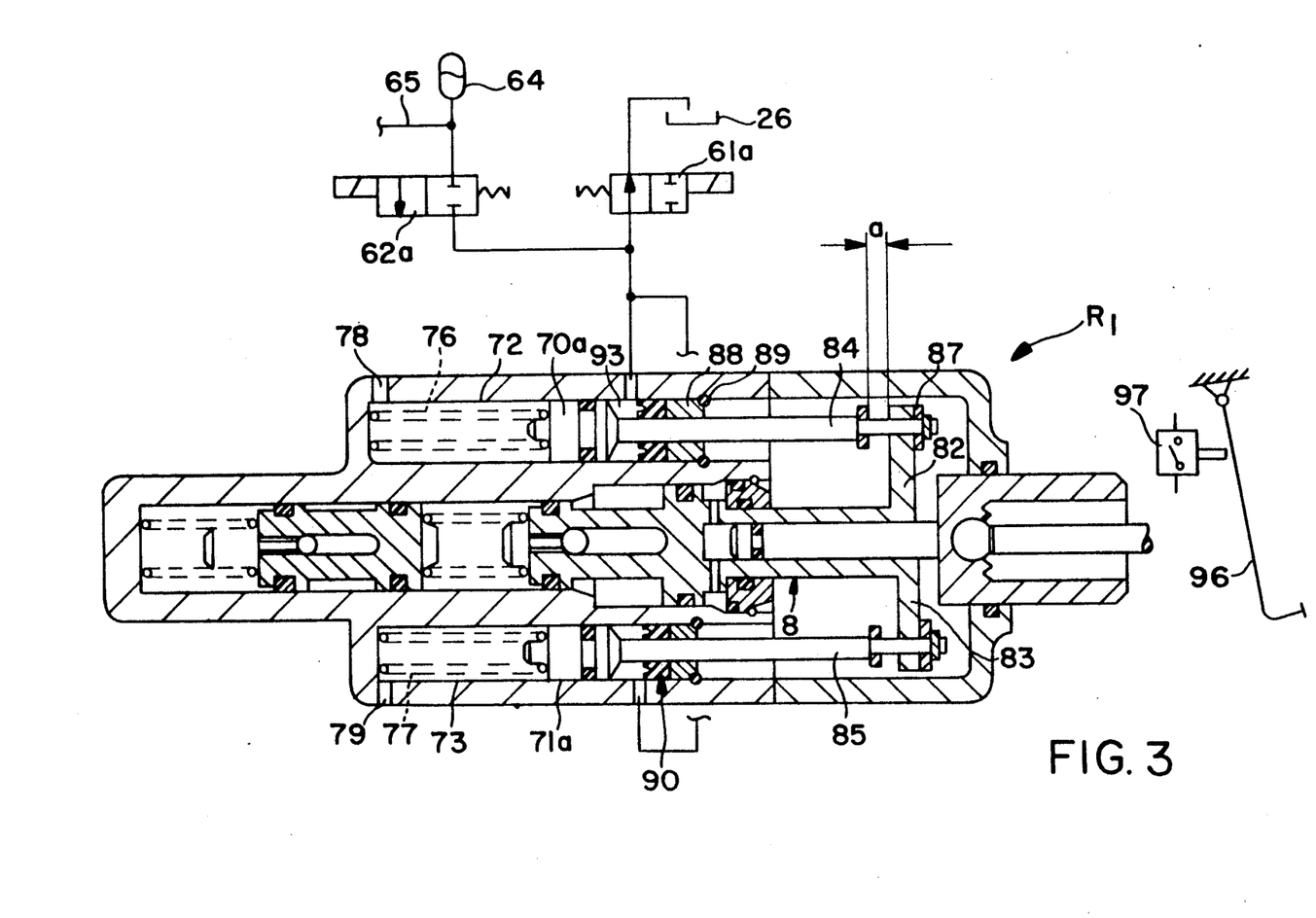
FIG. 3 is a longitudinal section through a different exemplary embodiment of a booster of FIG. 1 in a sectional plane corresponding to FIG. 2.

In FIG. 3, a booster R1 is shown, in which traction control without pedal feedback can be executed at the same time. This booster R1 is essentially embodied as described in conjunction with FIG. 1. Two restoring pistons 70a and 71a are again provided, as described in conjunction with FIG. 2. This time, however, the restoring springs 70a and 71a are firmly connected to the stops 82 and 83, via a tappet rod 84 and 85, but an idle stroke a of the restoring pistons 70a and 71a between two stop disks 86 and 87 is allowed here.

The tappet rods 84 and 85 each penetrate a cap bushing 88 in the respective blind bore 72 and 73. The cap bushing 88 is kept in position via a snap ring 89.

The cap bushing 88 is followed by a lip seal 90, that with each of the restoring pistons 70a and 71a forms a respective work chamber 93 for the traction control.

The traction control is preferably controlled via two magnetic valves 61a and 62a. These magnetic valves 61a and 62a are then connected to the pressure reservoir 64 as in FIG. 1, or to some other return line. An arrangement separate from the control circuit is also possible, however.

FIG. 3 shows a switching state for the magnetic valves 61a and 62a that is normal, except during traction control, the magnetic valve 62a is closed, while the magnetic valve 61a permits the return flow of pressure fluid out of the work chamber 93, for instance to the supply tank 26.

In traction control, the two valves are both switched over, so that control fluid can then correspondingly flow via the magnetic valve 62a into the work chamber 93.

Since the magnetic valves 61a and 62a, for which only the line 65 is shown, remain unswitched in traction control operation, a pressure of zero prevails in the control pressure chamber 12; that is, no pressure is exerted on the foot pedal 96. If the driver wishes to brake during traction control, he can initially actuate the pedal 96 without exerting great force and can switch the traction control off via a switch 97. To prevent the piston rod 3 in this case from simply dropping until it strikes the master cylinder piston 8, an intermediate pressure can be built up in the control piston chamber 12 by pulsation via the magnetic valves 61 and 62.

Figure 4:
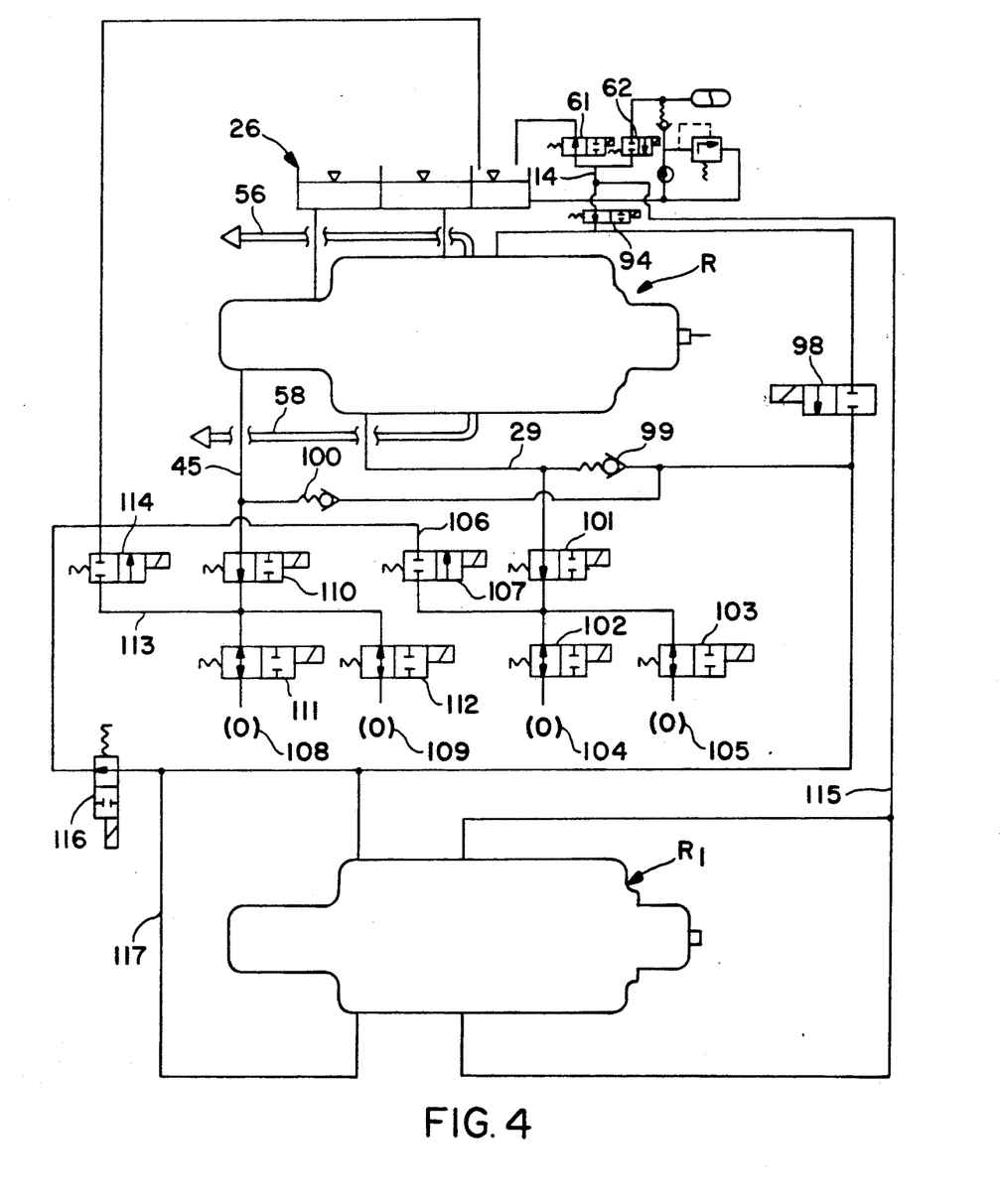
FIG. 4 is a block circuit diagram of a complete brake system, in an embodiment having separately shown sectional planes of the booster corresponding to FIGS. 1 and 3.

In FIG. 4, the inclusion of the booster according to the invention into a brake system is shown; here, the two sectional planes of the booster of FIGS. 1 and 3 are shown separately. A magnetic valve 98 is also provided in the connection to the brake line 29 and 45, respectively, with the interposition of two one-way check valves 99 and 100. The brake line 29 also leads via a master cylinder shutoff valve 101, known in ABS control, and via wheel valves 102 and 103 to the wheel brake cylinders 104 and 105 of the left and right front wheels. The return line 106 to the supply tank 26 is likewise controlled by a pressure reduction valve 107.

A master cylinder shutoff valve 110, wheel valves 111 and 112, and a pressure reduction valve 114 in the return line 113 are incorporated into the brake line 45 as well, between the wheel brake cylinders 108 and 109 of the left and right rear wheels and the second brake chamber 35.

In the sectional plane for the traction control, the booster R1, or the work chamber 93, not shown here, communicates via the line 115 directly with the line 14 upstream of the magnetic valves 61 and 62. As a result, in the servo situation, the restoring pistons 70 and 71 connected to the master cylinder piston 8 reinforce the action of this master cylinder piston 8 acting as a servo piston, because all the corresponding chambers 12 and 93 are subjected to pressure.

In traction control, contrarily, a valve 94 incorporated into the line 14 is closed, and the magnetic valves 61 and 62 take over the control. Thus, the control piston chamber 12 is without pressure. A further outlet valve 116, which is incorporated into a return line 117 for the restoring chambers 76 and 77, is likewise kept open. It is thus assured that only the restoring pistons 70 and 71 can be subjected to pressure, via the work chamber 93, whenever the magnetic valves 61 and 62 are switched accordingly.

The ABS control, contrarily, is effected above all via the feed valve 98, and the outlet valve 116 is closed. Via the feed valve 98, both the restoring chambers 76 and 77 and the brake chambers 27 and 35, the latter chambers via the check valves 99 and 100, are put under pressure. Upon a pressure buildup, the valves 101, 102, 103 and 110, 111, 112 are thus open, while the valves 114 and 107 are closed. To maintain the brake pressure, the valves 102, 103 and 111, 112 are closed. To build up pressure, the valves 102, 103 and 111, 112 are then opened again, as are valves 107 and 114, while valves 101 and 110 are closed.

Naturally traction control with the booster of FIGS. 1 and 2 would also be conceivable, in which case the control piston chamber 12 is used for traction control. In that case the line 115 and the magnetic valve 94 are omitted. The control of the traction control is done by the magnetic valves 61 and 62. A disadvantage in this case is that to switch off the traction control, the driver has to fight a stiff pedal. The block circuit diagram for this version is shown in FIG. 5.

Figure 6:
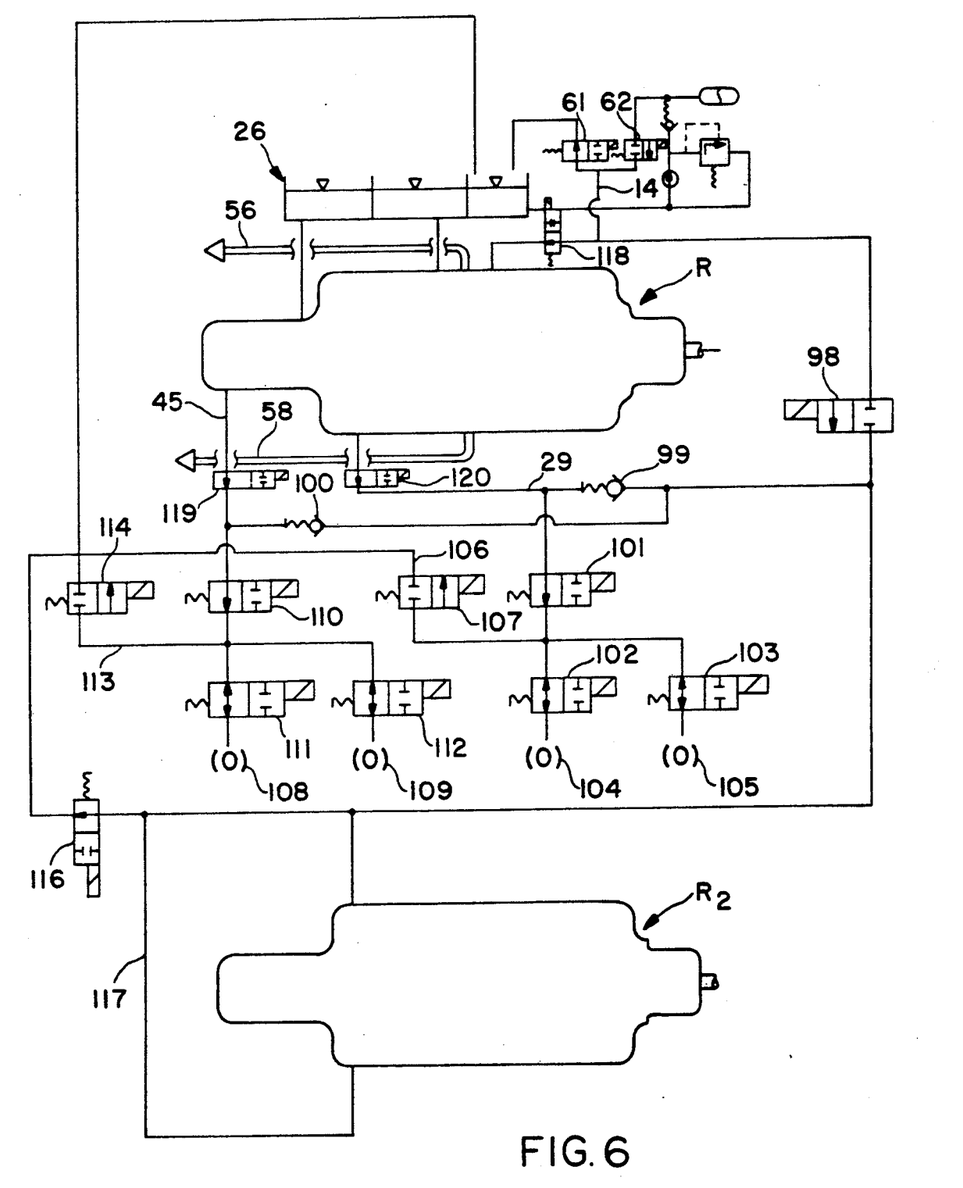
FIG. 6 is a block circuit diagram of a complete brake system, in a further embodiment having a separately shown sectional plane of the booster of FIGS. 1 and 2.

In FIG. 6, traction control by fluid feeding is illustrated. To accomplish this, a further magnetic valve 118 is incorporated into the line 14, toward the control piston chamber 12. In the event that traction control comes into play, this magnetic valve blocks the line 14 to the control piston chamber 12, while the magnetic valve 98 opens. Two further magnetic valves 119 and 120 in the brake line 29 and 45, respectively, also close off the first and second brake chambers 27 and 35, respectively. Feeding to the wheel brake cylinders 104, 105, 108 and 109 then takes place via the check valves 99 and 100 and the magnetic valves located respectively after them.

Figure 5:
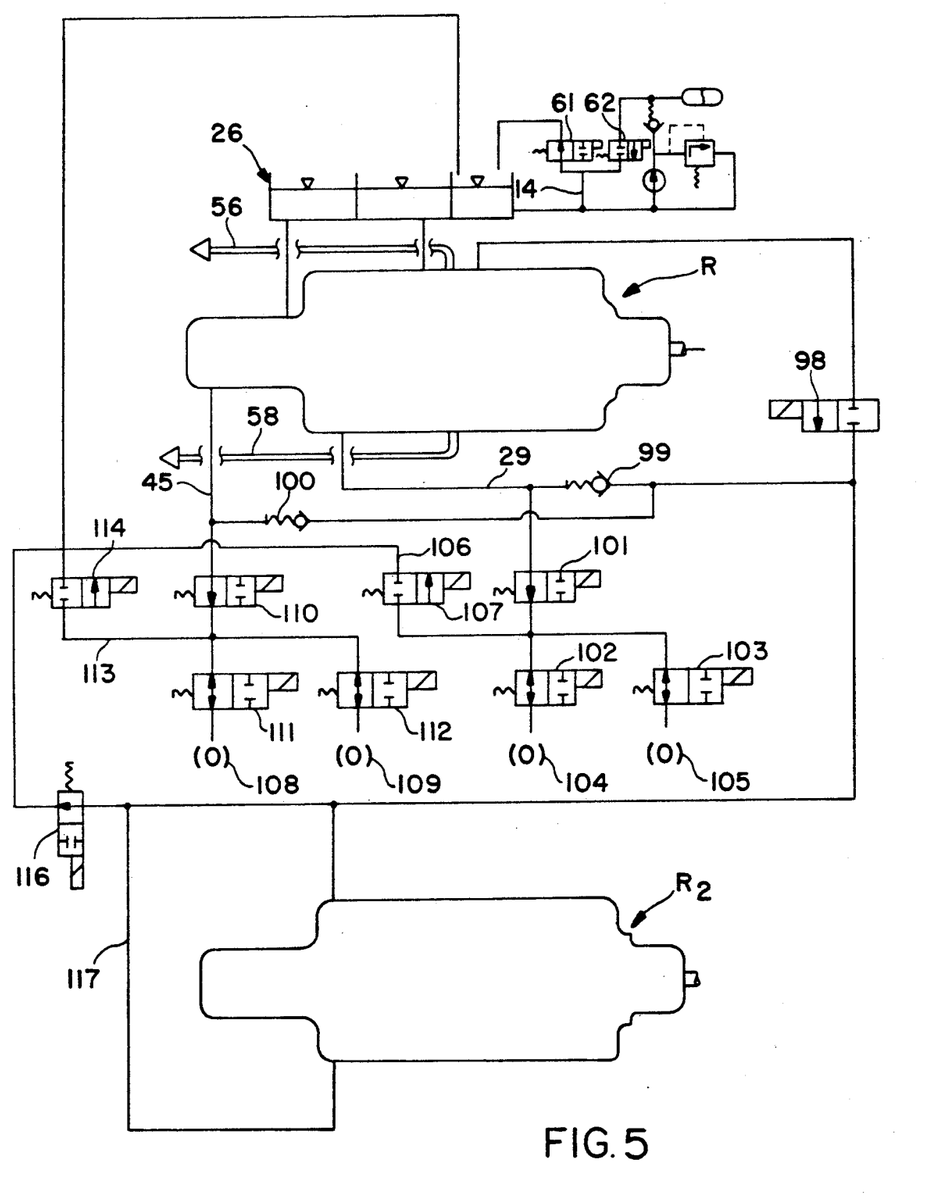
FIG. 5 is a block circuit diagram of a complete brake system in a further embodiment having a separately shown sectional plane of the booster of FIGS. 1 and 2.
Figure 7:
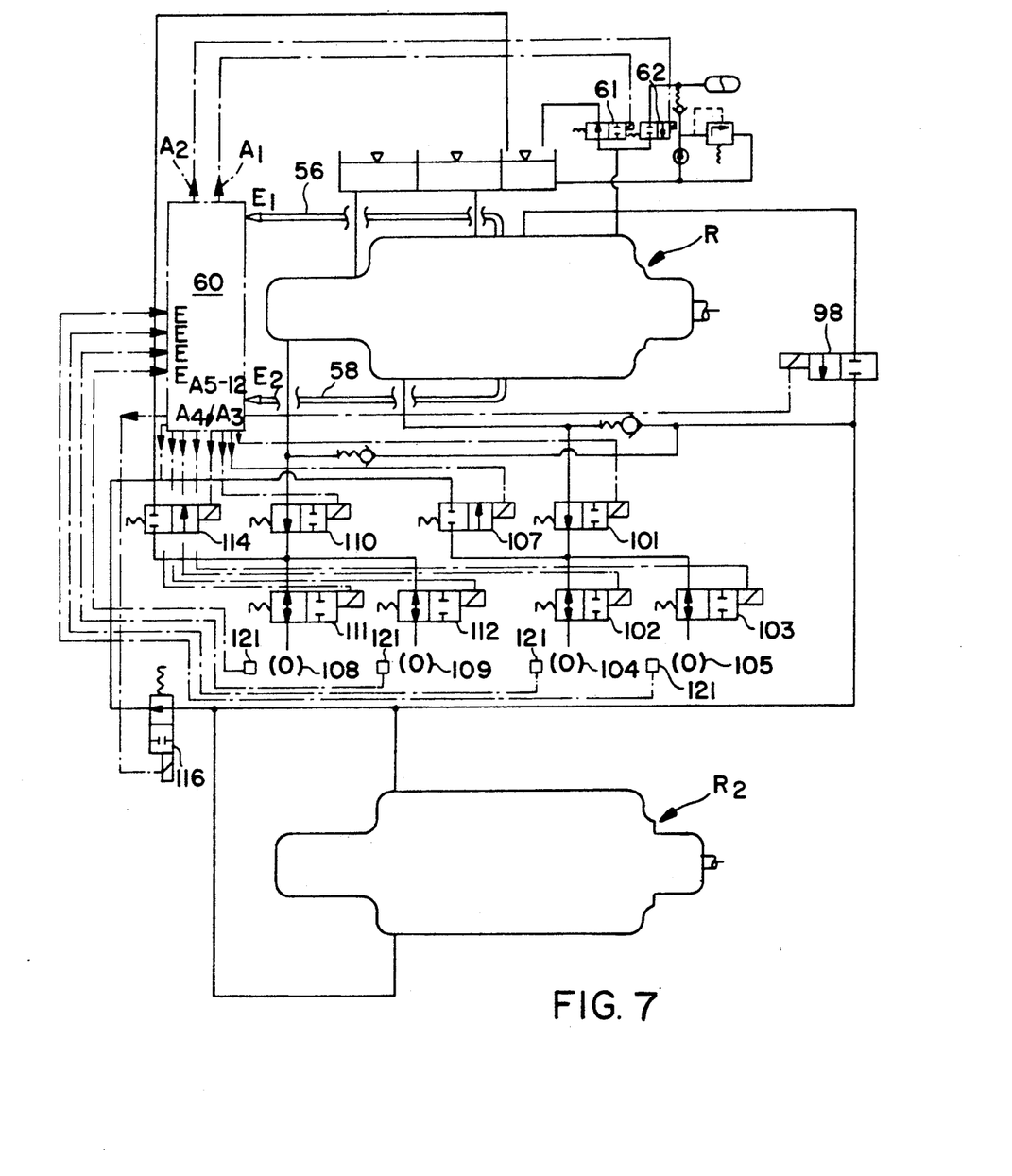
FIG. 7 is a block circuit diagram corresponding to FIG. 5, with a corresponding electronic circuit.

In FIG. 7, the electronic control of a brake system as shown in FIG. 5 is shown. This is intended merely as an example; a similar illustration would also be possible for the exemplary embodiments of FIG. 4 or FIG. 6. Via the electrical lines 56 and 58, the electronic unit 60 receives the respective input signals E1 and E2 of the inductive transducers 49 and 50. These input signals, after processing in the electronic unit, are sent via outputs A1 and A2 to the magnetic valves 61 and 62.

Each of the wheel brake cylinders 104, 105, 108 and 109 is assigned one wheel sensor 121, the signals of which reach the electronic unit via the inputs E3, E4, E5 and E6. After processing of these signals in the electronic unit 60, the magnetic valves 98 and 116 are controlled via the outputs A3 and A4; furthermore, each of the outputs A5–A12 assumes the triggering of one of the valves 103, 107, 110–112 and 114.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A brake system having a master brake cylinder that is embodied as a hydraulic booster disposed in a housing, a piston rod (3) that is actuatable by a brake pedal (96), at least one master cylinder piston (8) in a master cylinder bore (18), said at least one master cylinder piston includes an axial bore (7), a tappet (6) in said axial bore, said tappet extends from said piston rod (3) in axial alignment with said at least one master cylinder piston to provide a minimum spacing between an end of said tappet (6) and said at least one master cylinder piston, said tappet (6) acting upon said at least one master cylinder piston, at least one brake chamber (27, 35) which can be put under brake pressure by said at least one master cylinder piston so that brake fluid flows via brake lines (29, 45) to various wheel brake cylinders (30, 46), a control piston chamber (12), at least one control element means (61, 62) that communicates with said control piston chamber (12) and with a device (64, 67) for supplying control fluid to said control piston chamber which is associated with said at least one master cylinder piston, an electronic unit (60), a first travel transducer (49) that detects a linear movement of said piston rod (3), said first travel transducer controls said at least one control element means via said electronic unit (60), a second travel transducer (50) is associated with said at least one master cylinder piston (8), said second transducer directs a signal to said electronic unit (60) which likewise controls said at least one control element means (61, 62), said at least one control element means (61, 62) connects said control piston chamber (12) via a supply line (14) to a supply tank (26) for control fluid, or to a pressure reservoir (64) and feed pump (67) for control fluid, or is capable of being shut off entirely.

2. A brake system as defined by claim 1, in which said electronic unit (60) also triggers additional control element means (61a, 62a), which for a traction control operation connect a work chamber (93) with the pressure reservoir (64) for the control fluid.

3. A brake system as defined by claim 1, in which said at least one control element means comprises one 2/2-way magnetic valve (61, 61a) incorporated in a line between said control piston chamber (12) and the supply tank (26), and one 2/2-way valve (62, 62a) incorporated in a line between at least one of the pressure reservoir (64) or the feed pump (67) and said control piston chamber (12).

4. A brake system as defined by claim 2, in which said at least one control element means comprises one 2/2-way magnetic valve (61, 61a) incorporated in a line between said control piston chamber (12) and the supply tank (26), and one 2/2-way valve (62, 62a) incorporated in a line between at least one of the pressure reservoir (64) or the feed pump (67) and said control piston chamber (12).

5. A brake system as defined by claim 1, in which said first and second travel transducers (49, 50) are embodied as inductive transducers.

6. A brake system as defined by claim 1, in which said first and second travel transducers (49, 50) are embodied as potentiometers.

7. A brake system as defined by claim 5, in which blind bores (47, 48) are provided in said housing (1, 2) axially parallel to the master cylinder bore (18), in which coil laminations (51, 52) that are penetrated by the transducers (49, 50) are located.

8. A brake system as defined by claim 7, in which said first and second transducers (49, 50) are braced in their respective blind bores (47, 48) operative counter to a force of compression springs (53, 54).

9. A brake system as defined by claim 8, in which one end of said first transducer (49) is supported on an extension (55) of the piston rod (3), and one end of said second transducer (50) meets a stop (57) of the master cylinder piston (8).

10. A brake system as defined by claim 1 which includes a restoring device for an anti-skid control associated with said at least one master cylinder piston (8), said restoring device comprises two restoring pistons (70, 71), which under pressure of the control fluid acts upon stops (82, 83) on said at least one master cylinder piston (8).

11. A brake system as defined by claim 10, in which said restoring piston (70, 71) is disposed in a blind bore (72, 73) likewise disposed in said housing (1, 2) axially parallel to said master cylinder bore (18), in which a blind bore corresponding restoring chamber (76, 77) for the pressure fluid is also located.

12. A brake system as defined by claim 11, in which said restoring chamber (76, 77) communicates via an outlet valve (116) with a supply tank (26) and via a feed valve (98) with a supply line (14).

13. A brake system as defined by claim 10, in which said restoring device also communicates with a traction control.

14. A brake system as defined by claim 13, in which said at least one control element means (61, 62, 61a, 62a) is pulsable during traction control for preventing the brake pedal from dropping to a floor.

15. A brake system having a master brake cylinder that is embodied as a hydraulic booster disposed in a housing, a piston rod that is actuatable by a brake pedal, at least one master cylinder piston in a master cylinder bore, said piston rod acting upon said at least one master cylinder piston, at least one brake chamber which can be put under brake pressure by said at least one master cylinder piston so that brake fluid flows via brake lines to various wheel brake cylinders, a control piston chamber, at least one control element that communicates with said control piston chamber and with a device for supplying control fluid to said control piston chamber which is associated with said at least one master cylinder piston, an electronic unit (60), a first travel transducer (49) that detects a linear movement of said piston rod, said first travel transducer controls said at least one control element via said electronic unit (60), a second travel transducer (50) is associated with said at least one master cylinder piston (8), said second transducer directs a signal to said electronic unit (60) which likewise controls said at least one control element (61, 62), a restoring device for an anti-skid control is associated with said at least one master cylinder piston (8), said restoring device comprises at least one restoring piston (70, 71), which under pressure of a pressure fluid acts upon stops (82, 83) on said at least one master cylinder piston (8), said at least one restoring piston (70, 71) is disposed in a blind bore (72, 73) likewise disposed in said housing (1, 2) axially parallel to said master cylinder bore (18), in which a blind bore corresponding restoring chamber (76, 77) for the pressure fluid is also located, said restoring chamber (76, 77) communicates via an outlet valve (116) with a supply tank (26) and via a feed valve (98) with a supply line (14), said feed valve (98) communicates via check valves (99, 100) with the brake lines (29, 45) for anti-skid control.

16. A brake system as defined by claim 15, in which a first valve (118) is incorporated in the supply line (14) between said control piston chamber (12) and a connection between the restoring chamber (76, 77) and said supply line (14), and a second valve (119, 120) is incorporated into a brake line (29, 45).

17. A brake system having a master brake cylinder that is embodied as a hydraulic booster disposed in a housing, a piston rod that is actuatable by a brake pedal, at least one master cylinder piston in a master cylinder bore, said piston rod acting upon said at least one master cylinder piston, at least one brake chamber which can be put under brake pressure by said at least one master cylinder piston so that brake fluid flows via brake lines to various wheel brake cylinders, a control piston chamber, at least one control element that communicates with said control piston chamber and with a device for supplying control fluid to said control piston chamber which is associated with said at least one master cylinder piston, an electronic unit (60), a first travel transducer (49) that detects a linear movement of said piston rod, said first travel transducer controls said at least one control element via said electronic unit (60), a second travel transducer (50) is associated with said at least one master cylinder piston (8), said second transducer directs a signal to said electronic unit (60) which likewise controls said at least one control element (61, 62), a restoring device for an anti-skid control is associated with said at least one master cylinder piston (8), said restoring device comprises at least one restoring piston (70, 71), which under pressure of a pressure fluid acts upon stops (82, 83) on said at least one master cylinder piston (8), said at least one restoring piston (70, 71) is disposed in a blind bore (72, 73) likewise disposed in said housing (1, 2) axially parallel to said master cylinder bore (18), in which a blind bore corresponding restoring chamber (76, 77) for the pressure fluid is also located, said restoring chamber (76, 77) communicates via an outlet valve (116) with a supply tank (26) and via a feed valve (98) with a supply line (14), a first valve (118) incorporated in the supply line (14) between said control piston chamber (12) and a connection between the restoring chamber (76, 77) and said supply line (14), and a second valve (119, 120) incorporated into at least one brake line (29, 45).

18. A brake system having a master brake cylinder that is embodied as a hydraulic booster disposed in a housing, a piston rod that is actuatable by a brake pedal, at least one master cylinder piston in a master cylinder bore, said piston rod acting upon said at least one master cylinder piston, at least one brake chamber which can be put under brake pressure by said at least one master cylinder piston so that brake fluid flows via brake lines to various wheel brake cylinders, a control piston chamber, at least one control element that communicates with said control piston chamber and with a device for supplying control fluid to said control piston chamber which is associated with said at least one master cylinder piston, an electronic unit (60), a first travel transducer (49) that detects a linear movement of said piston rod, said first travel transducer controls said at least one control element via said electronic unit (60), a second travel transducer (50) is associated with said at least one master cylinder piston (8), said second transducer directs a signal to said electronic unit (60) which likewise controls said at least one control element (61, 62) a restoring device for an anti-skid control is associated with said at least one master cylinder piston (8), said restoring device also communicates with a traction control, and said restoring device comprises a restoring piston (70a, 71a) having stops (82, 83) resting firmly on said at least one master cylinder piston (8), allowing an idle stroke having a length (a).

19. A brake system as defined by claim 18, in which said restoring piston (70a, 71a) divides a restoring chamber (76, 77) for anti-skid control from the work chamber (93) for the traction control.

20. A brake system as defined by claim 19, in which said restoring chamber (76, 77) is embodied in the housing (1, 2) in a blind bore (72, 73) disposed axially parallel to the master cylinder bore (18), in which blind bore the restoring piston (70a, 71a) also slides, wherein beginning at the restoring piston (70a, 71a) a tappet rod (84, 85) reaches through a lip seal (90) and a cap bushing (88), before it is fixed at the stop (82, 83).

21. A brake system as defined by claim 20, in which said restoring chamber (93) communicates via a line (115) with the supply line (14) upstream of the control element (61, 62).

22. A brake system as defined by claim 21, in which a control valve (94) is incorporated between a mouth of the line (115) into the supply line (14) and the control piston chamber (12).

* * * * *